US006912726B1

(12) United States Patent
Chen et al.

(10) Patent No.: US 6,912,726 B1
(45) Date of Patent: Jun. 28, 2005

(54) METHOD AND APPARATUS FOR INTEGRATING HYPERLINKS IN VIDEO

(75) Inventors: Jeane Chen, Chappaqua, NY (US); Ephraim Feig, Chappaqua, NY (US); Liang Jie Zhang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/091,604

(22) PCT Filed: Apr. 2, 1997

(86) PCT No.: PCT/IB97/00331

§ 371 (c)(1),
(2), (4) Date: Jun. 16, 1998

(87) PCT Pub. No.: WO98/44435

PCT Pub. Date: Oct. 8, 1998

(51) Int. Cl.[7] ............................ G06T 1/00; H04N 7/10; H04N 5/04
(52) U.S. Cl. ...................... 725/113; 725/112; 725/135; 345/760
(58) Field of Search ............................... 725/109–113; 345/760

(56) References Cited

U.S. PATENT DOCUMENTS

| 5,642,171 | A | * | 6/1997 | Baumgertner et al. ...... 348/515 |
| 5,708,845 | A | * | 1/1998 | Wistendahl et al. ..... 707/500.1 |
| 5,727,141 | A | * | 3/1998 | Hoddie et al. .............. 345/475 |
| 5,818,441 | A | * | 10/1998 | Throckmorton et al. .... 725/110 |
| 5,918,012 | A | * | 6/1999 | Astiz .......................... 709/217 |
| 5,929,849 | A | * | 7/1999 | Kikinis ....................... 725/113 |
| 6,058,141 | A | * | 5/2000 | Barger et al. ............... 375/240 |
| 6,137,544 | A | * | 10/2000 | Dimitrova et al. .......... 348/700 |
| 6,256,785 | B1 | * | 7/2001 | Klappert ..................... 725/136 |
| 2002/0007493 | A1 | * | 1/2002 | Butler et al. ................. 725/109 |

FOREIGN PATENT DOCUMENTS

| JP | 06-038156 | 2/1994 |
| JP | 06-118916 | 4/1994 |
| JP | 06-119229 | 4/1994 |
| JP | 06-217252 | 8/1994 |
| JP | 08-149426 | 6/1996 |
| JP | 09-27936 | 1/1997 |
| JP | 09-200682 | 7/1997 |

* cited by examiner

*Primary Examiner*—Vivek Srivastava
*Assistant Examiner*—Reuben M. Brown
(74) *Attorney, Agent, or Firm*—Richard M. Ludwin, Esq.; McGinn & Gibb, PLLC

(57) ABSTRACT

Hypervideo data is encoded with two distinct portions, a first portion which contains the video data and a second portion, typically much smaller than the first, which contains hyperlink information associated with the video data. Preferably, the first and second portions are stored in separate and distinct files. The encoding of the hyperlink information is preferably made efficient by encoding only key frames of the video, and by encoding hot link regions of simple geometries. A hypervideo player determines the hot link regions in frames between key frames by interpolating the hot link regions in key frames which sandwich those frames.

69 Claims, 7 Drawing Sheets

| HEADER | DATA (1) | DATA (2) | ... | DATA (N) |
|---|---|---|---|---|

FIG.2A

| START | AV (j) | TIME (j) | ENCODED-DATA (j) |
|---|---|---|---|

FIG.2B

| HD | OB (1) | OB (2) | ... | OB (j) | ... | OB (N) |
|---|---|---|---|---|---|---|

FIG.3A

| ON (j) | OA (j) | L (j,1) | L (j,2) | ... | L (j,$k_j$) | T (j) |
|---|---|---|---|---|---|---|

FIG.3B

| B (j,k) | N (j,k) | X (j,k,1) | Y (j,k,1) | X (j,k,2) | Y (j,k,2) |
|---|---|---|---|---|---|

FIG.3C

METHOD AND APPARATUS FOR INTEGRATING HYPERLINKS IN VIDEO

BACKGROUND OF THE INVENTION

1. Field of the Invention

The present invention is related to systems for creating and editing video and, more specifically, to systems that integrate hyperlink information with video.

2. Related Art

Hypermedia is a term used to describe the fusion of two other new technologies: multimedia and hypertext. Multimedia refers to information forms containing text, images, graphics, audio and video. A hypertext document is one which is linked to other documents via hyperlinks. A hyperlink often appears in a hypertext document as a piece of highlighted text. The text is usually a word or phase describing something of which a user might want further information. When the user activates the hyperlink, typically by clicking on it using a mouse, a link command is initiated; which causes a program at the linked address to be executed; which, in turn, causes the user's view to be updated so as to show the linked document, which typically contains more information on the highlighted word or phase concerned. Such information may be in the form of text, audio, video, a two-dimensional image or a three-dimensional image. Hyperlinks make it easy to follow cross-references between documents. Hypermedia documents are hypertext documents with multimedia capabilities. The regions on the screen which are active hyperlinks are called hot-links.

Nowadays, most people are familiar with the application of hypertext by using a mouse to click on hot-links on computer displays of homepages from the World Wide Web (the Web) on the Internet. Data on the Web is located via URLs. URL stands for "Uniform Resource Locator." It is a draft standard for specifying an object on the Internet. It specifies access method and the location for the files. Documents on the Web are written in a simple "markup language" called HTML, which stands for Hypertext Markup Language. File formats of data on the Web are specified as MIME formats; MIME stands for "Multipurpose Internet Mail Extensions." (Reference: http://www.oac.uci.edu/indiv/ehood/MIME/MIME.html). Examples of file formats on the Web are .au (probably the most common audio format), .html (HTML files), .jpg (JPEG encoded images), .mid (Midi music format), mpg (MPEG encoded video), and .ps (postcript files). While presently hypertext technology is most common in text and image media, it is beginning to also appear in animation and video.

HyperVideo is the name for video augmented with hyperlinks. NEC Corporation has demonstrated to Newsbytes such a system, named "video hypermedia system," that will bring the point and click capabilities of hypertext to full motion video. A more detailed description of HyperVideo may be found in the article "NEC's Video Hypertext System", Newsbytes News Network, Jul. 31, 1995.

HyperCafe is an experimental hypermedia prototype, developed as an illustration of a general hypervideo system. This program places the user in a virtual cafe, composed primarily of digital video clips of actors involved in fictional conversations in the cafe. HyperCafe allows the user to follow different conversations, and offers dynamic opportunities of interaction via temporal, spatio-temporal and textual links to present alternative narratives. A more detailed description of HyperCafe may be found in the article by Nitin "Nick" Sawhney, David Balcom and Ian Smith, "HyperCafe: Narrative and Aesthetic Properties of Hypervideo," Hypertext '96: Seventh ACM Conference on Hypertext (Recipient of the first Engelbart Best Paper Award at Hypertext '96 (Mar. 20, 1996), http://silver.skiles.gatech.edu/gallery/hyper cafe/HT96_Talk/.

VideoActive is an authoring tool for the creation of interactive movies. It uses the HyperVideo technology to identify hot-links in digital video files. The tool allows one to prepare video clips with the hot-link information and then to link them to other types of media. A more detailed description of VideoActive may be found in "HyperVideo Authoring Tool (User Notes)", http://ephyx.com/, Pre-Release version, February 1996.

Progressive Networks, Inc. has included "click-able video maps" in their RealVideo technology. A mouse click on a portion of the video can cause a new video clip to be played, seek within the current clip, or send a URL message. They provide the RealPlayer which enables this interactivity. A more detailed description of RealVideo may be found at Progressive Network, Inc., "RealVideo Technical White Paper", http://www.realaudio.com/products/realvideo/overview/index.html.

A feature shared by all these technologies is that the size of the hypervideo is huge. Basically, the hypervideo information contains both the encoded video and the hyperlink information. In order to augment hyperlink information to a video clip, one has to create a file that is larger than the original video file. In order to transmit hyperlink information one has to transmit a huge file, even if the receiver may have locally a copy of the original video file. Frequently a user may have a video file on a CD-ROM, and would like to augment hyperlink information to this video. With the existing technologies, the user would have to either generate a file or download an already generated file at least as large as the original.

With existing technology, the creation of hypervideo content is tedious because the hot information is encoded in each frame in which the hypervideo link exists.

SUMMARY OF THE INVENTION

The present invention addresses this issue by creating a small file which contains a pointer to the corresponding video file and which encodes the hyperlink information in an efficient manner. Hypervideo data is encoded with two distinct portions, a first portion which contains the video data and a second portion, typically much smaller than the first, which contains information regarding the identification of the first portion and the hyperlink information. The encoding of the hyperlink information is made efficient by encoding only key frames in the video, and by encoding hot link regions of simple geometries. A hypervideo player determines the hot link regions in frames between key frames by interpolating the hot link regions in key frames which sandwich those frames.

In a preferred embodiment, the hot link regions are rectangular with axes parallel to the major axes, and encoded by listing their top-left and bottom-right vertices. The interpolation of hot link regions between key frames is linear. This schemes works well because in general motion of objects in time intervals in video can be well approximated by motions in contiguous time subintervals, each of which is approximately linear. This scheme both greatly reduces the amount of data required to encode the hot region information and speeds up significantly the process of creating hypervideo content.

BRIEF DESCRIPTION OF THE DRAWINGS

FIGS. 2(A) and (B) illustrates format of an MPEG encoded video file;

FIGS. 3(A)–(C) illustrate formate of a hyperlink file according to the present invention.

DETAILED DESCRIPTION OF THE INVENTION

Figure 1:
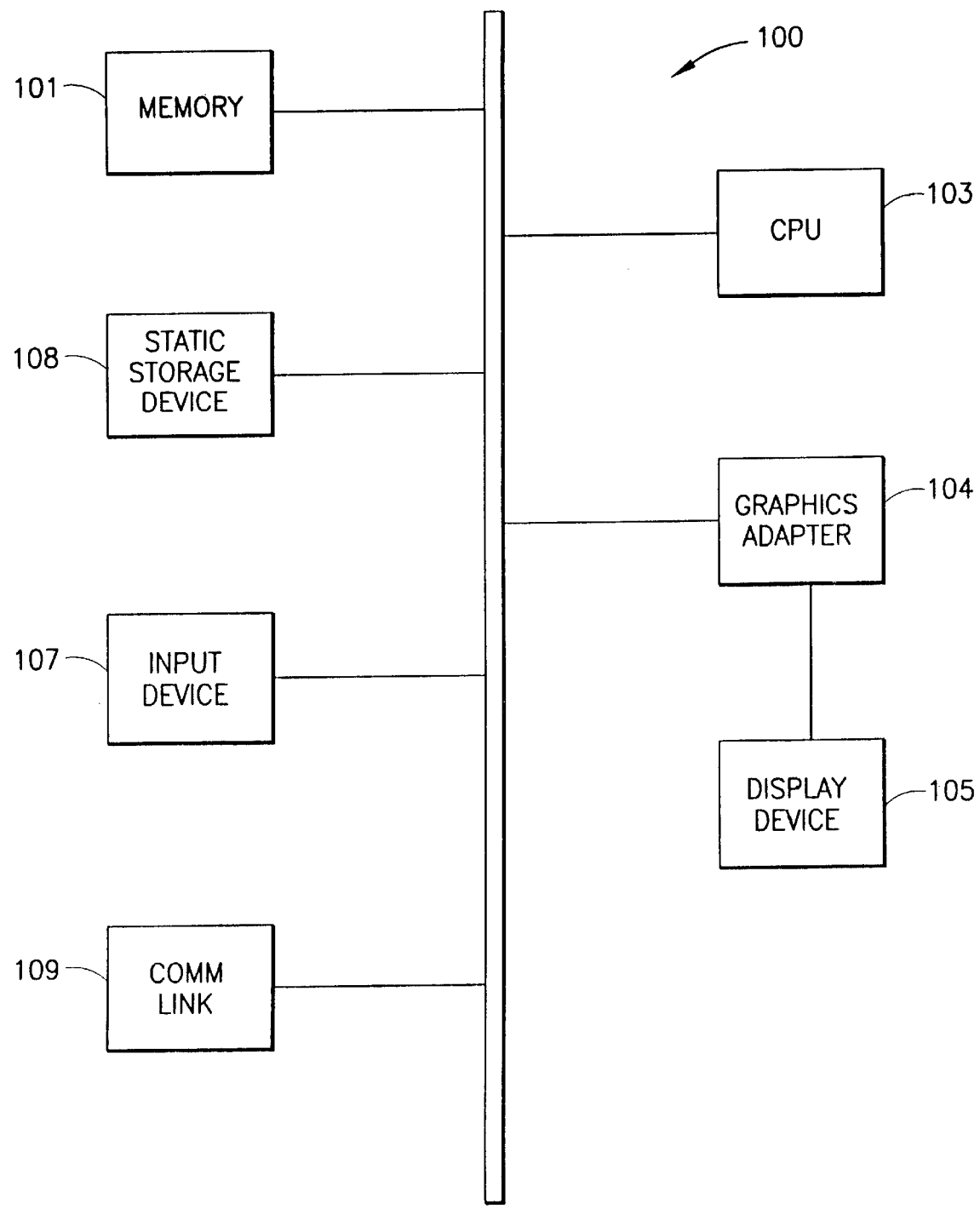
FIG. 1 is a functional block diagram of a computer processing system that may be utilized by the preferred embodiment of the present invention.

The present invention may be implemented on any computer processing system including, for example, a personal computer or a workstation. As shown in FIG. 1, a computer processing system as may be utilized by the present invention generally comprises memory 101, at least one central processing unit (CPU) 103 (one shown), and at least one user input device 107 (such as a keyboard, mouse, joystick, voice recognition system, or handwriting recognition system). In addition, the computer processing system includes a nonvolatile memory, such as (ROM), and/or other nonvolatile storage devices 108, such as a fixed disk drive, that stores an operating system and one or more application programs that are loaded into the memory 101 and executed by the CPU 103. In the execution of the operating system and application program(s), the CPU may use data stored in the nonvolatile storage device 108 and/or memory 101. In addition, the computer processing system includes a graphics adapter 104 coupled between the CPU 103 and a display device 105 such as a CRT display or LCD display. The application program and/or operating system executed by the CPU 103 generates graphics commands, for example, a command to draw a box (or window), a command to display a bit map image, a command to render a three-dimensional model, or a command to display a video file. Such commands may be handled by the application program/operating system executed by the CPU 103, or by hardware that works in conjunction with the application program/operating system executed by the CPU 103, wherein the appropriate pixel data is generated and the display device 105 is updates accordingly.

In addition, the computer processing system may include a communication link 109 (such as a network adapter, RF link, or modem) coupled to the CPU 103 that allows the CPU 103 to communicate with other computer processing systems over the communication link, for example over the Internet. The CPU 103 may receive portions of the operating system, portions of the application program(s), or portions of the data used by the CPU 103 in executing the operating system and application program(s) over the communication link 109.

It should be noted that the application program(s)/operating system executed by the CPU 103 may perform the methods of the present invention described below. Alternatively, portions or all of the methods described below may be embodied in hardware that works in conjunction with the application program/operating system executed by the CPU 103. In addition, the methods described below may be embodied in a distributed processing system whereby portions of such methods are distributed among two or more processing systems that are linked together via communication link 109.

According to the present invention, a second file (referred to below as a HotVideo data file), that corresponds to a given video file and preferably is separate and distinct from the corresponding video file, is provided that identifies hot-links in the corresponding video file. A hot-link (or hot-link region) is an area of pixels in one or more frames of a video file that represents a hyperlink to related information. When the user activates the hyperlink, typically by clicking on it using a mouse, a link command is initiated. The link command identifies a processing system and one or more operations to be performed by such processing system when the link command is initiated. The processing system identified by the link command may be the same system that is processing the video file, or may be a remote system that is coupled via a communication link to the system that is processing the video file. The initiation of the link command causes the operation identified by the link command to be executed by the processing system identified by the link command. Typically, execution of the link command causes the user's view to be updated so as to show linked content. The linked content typically contains information related to images displayed in or near the hot-link. Such information may be in the form of text, audio, video, a two-dimensional image or a three-dimensional image. An example of a link command may be a hypertext link in HTML format which causes a remote computer to download an HTML page to the user's processing system.

HotVideo Encoding Format

The encoding of hot-link regions in a particular video preferably utilizes the following schemes. First, the hot-link regions have simple geometries. In a preferred embodiment, the hot-link regions are rectangles whose edges lie along the major axes of the display, and specified by top-left and bottom-right pixel coordinates in a given frame of video. Second, the hot-link regions are not encoded in each frame. Rather, a user records hot-link regions in what are called key frames. Preferably, key frames are chosen so that the trajectory of objects associated with a given hot-link area in the time interval between such frames is approximately linear (that is, it has no acceleration). In this case, the hot-link region can be specified by its position is such key frames and the play-back device can perform linear interpolation to determine the position of the hot-link region in intermediate frames that lie between such key frames. A more detailed description of such key frames is set forth below.

Video files are encoded in various standard video formats, such as AVI, MPEG, raw YUV, and raw RGB. For example, Le Gall, Didier J., "MPEG video compression algorithm," Signal Process Image Commun v 4 n 2 April 1992 p 129–140, describes the MPEG video format. These video formats comprise header information describing some features of the video such as frame rate and file size; encoded pixel values of the color components of the various frames in the video; encoded audio data which synchronously accompanies the video. A frame of video is a single image; video comprises contiguous frames, such that when these are played at a sufficiently high frame rate (typically 25 or 30 frames per second) the result is a visually pleasant motion video. Frames in video are frequently numbered consecutively—frame 1 being the first frame, frame 2 the second, etc. The term frame number refers to the number of a frame in this consecutive ordering. As an example, FIGS. 2(A) and (B) illustrate the format of an MPEG encoded video file. The HEADER contains information such as system clock reference and bit rates for video and audio components. The data packets DATA(j), j=1, 2, . . . , N contain the actual encoded video and audio data. The DATA(j) are described in FIG. 2(B). A special START code signals the start of a new data packet; AV(j) identifies the forthcoming data as either audio or video; TIME(j) gives the timing information necessary to synchronize the video with the audio; ENCODED_DATA(j) are the actual audio or video data. The encoded video data contains information regarding pixel values of color components of frames in the video. In MPEG video, for example, the ENCODED_DATA(j) are binary streams of Huffman encoded run-lengths of quantized DCT coefficients. For a more detailed example see the MPEG standards document, Draft International Standard ISO/DIS 11172 (ISO/IEC JTC 1), herein incorporated by reference in its entirety.

FIGS. 3(A)–(C) illustrate the structure of the second file that contains the hyperlink information (i.e., the encoded HotVideo data). In FIG. 3(A), HD is header information which identifies a correspondence between the second file and the associated video file. In the preferred embodiment, the name of the second file is the same as the prefix of the name of the associated video file (for example, if the video file is an MPEG file called "title.mpg", the name in the header is "title"). The header information HD may also identify properties of the associated video file, for example, the size of the file (in bytes) and the frame-rate of the associated video file. Such information amy be used to verify that the associated video file matches the HotVideo data file, as file names may have changed. While this is not a fool-proof verification method, it will catch most mismatches.

OB(1), . . . OB(N) are N hot objects. Each hot object OB(j) defines a hot-link area in one or more frames in the associated video file. A description of their encoding is provided in FIG. 3B. Each object OB(j) is preferably encoded with an identifier ON(j), an object name, an associated link address OA(j), a list L(j,k) of identifiers of its hot-link regions in the video, and a trailer T(j) demarcating the end of the encoding for the j-th object. The symbol $K_j$ denotes the total number of identifiers of the j-th object.

As shown in FIG. 3C, an identifier L(j,k) specifies the spatial position of the hot-link region in a particular key frame. It preferably comprises four pieces of information: a bit B(j,k) specifying whether the key frame is an end frame or not: the number N(j,k) of the k-th key frame of the j-th object: the coordinates (x(j,k,1), y(j,k,1)) of the top-left vertex of the rectangular hot region in the k-th key frame of the j-th object; the coordinates (x(k,2), y(j,k,2)) of the bottom-right vertex of the rectangular hot region in the k-th key frame of the j-th object. The numbers N(j,k) correspond to the frame numbers, which are key frames or end frames.

The following table gives a description of the fields of the hyperlink file in FIGS. 3A–3C.

HD identifies the corresponding video file;

OB(j) for the j-th hot link object, identifies a link command to execute upon the user selecting the hot link;

ON(j) for the j-th hot link object, associates its name;

OA(j) for the j-th hot link object, identifies its link address;

L(j,k) for the j-th hot link object, identifies the k-th key frame used in encoding that object;

B(j,k) for the j-th hot link object, identifies whether or not the k-th key frame is an end frame;

N(j,k) for the j-th hot link object, identifies the frame number of the k-th key frame;

x(j,k,1) the top-left x-coordinate of the rectangular region defining the hot link region in the k-th frame of the j-th object;

y(j,k,1) the top-left y-coordinate of the rectangular region defining the hot link region in the k-th frame of the j-th object;

x(j,k,2) the bottom-right x-coordinate of the rectangular region defining the hot link region in the k-th frame of the j-th object; and y(j,k,2) the bottom-right y-coordinate of the rectangular region defining the hot link region in the k-th frame of the j-th object.

As described above, the hot-link region preferably has a rectangular geometry. However, the present invention is not limited in this respect; thus, the hot-link region may have any geometry. For example, the hot-link region may have a circular geometry, and be defined by position of the center of the circle and the radius of the circle.

HotVideo Player

Figure 4:
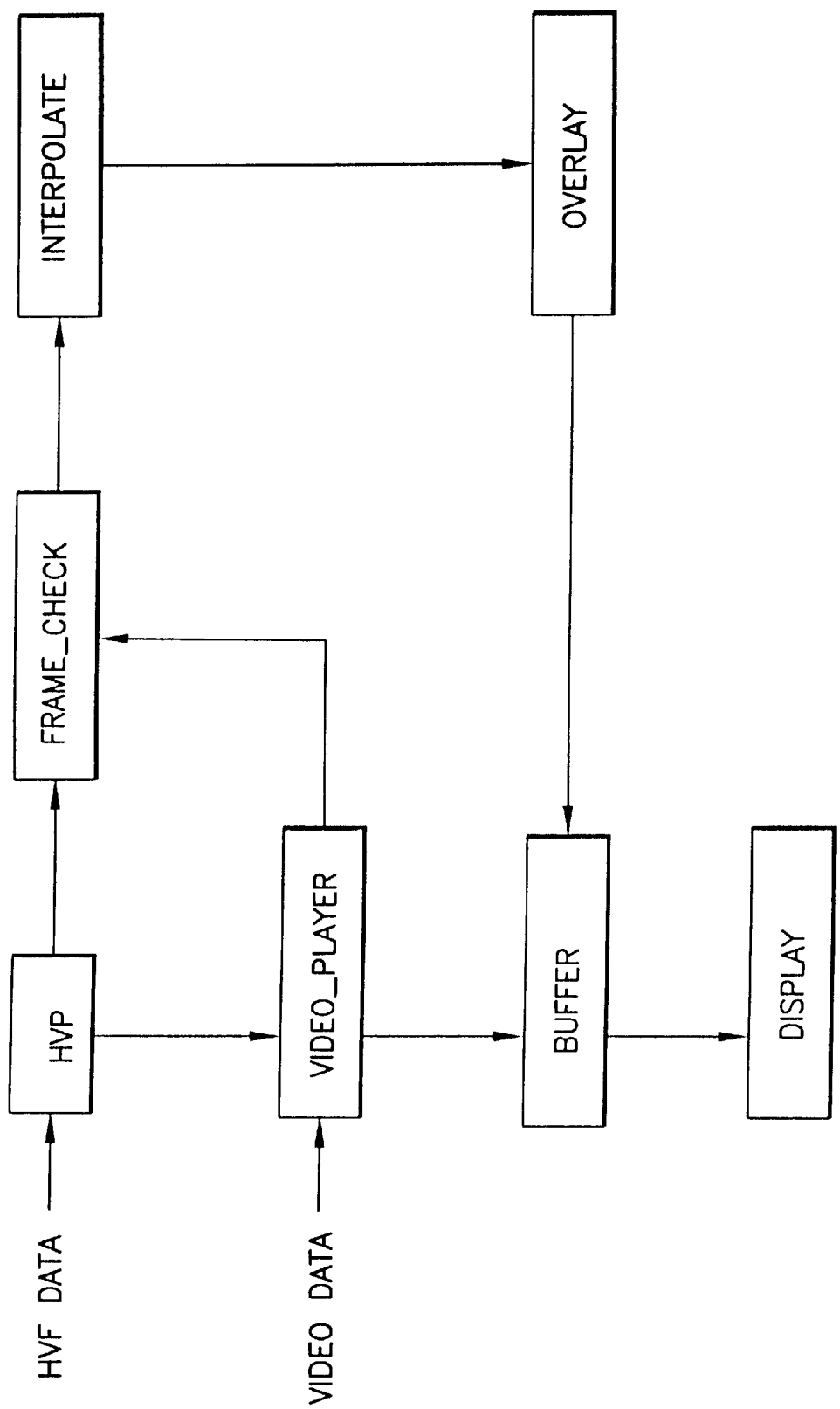
FIG. 4 is a functional block diagram illustrating a video player for integrating a video file with the hyperlink information stored in the hyperlink file of FIGS. 3(A)–(C).

FIG. 4 illustrates a HotVideo Player that reads a video file and integrates the hot-link information contained in the associated second file with the video contained in the video file this is the data described in FIGS. 2A–3C. The HotVideo Player may be part of an application program and/or operating system executed by the CPU 103 of FIG. 1. Alternatively, portions or all of the HotVideo Player man be embodied in hardware that works in conjunction with the application program/operating system executed by the CPU 103. In addition, portions of the HotVideo Player be embodied in a distributed processing system whereby portions of the functionality the HotVideo Player are distributed among two or more processing systems that are linked together via a communication link 109.

Referring now to FIG. 4, from the header data HD, HVP determines which video file to associate with the HotVideo file (second file). It sends a message to the VIDEO_PLAYER to open that video file. If the properties of the video file match those described in the header, the VIDEO_PLAYER starts playing the video file. Otherwise the VIDEO_PLAYER prods the user to find the appropriate video file. HVP also parses the data and arranges it in a format which makes searching through it simple.

The VIDEO_PLAYER begins playing the video. At each frame, the VIDEO_PLAYER passes to the FRAME_CHECK stage a value indicating which frame number it is presently displaying. It may happen that frames are dropped, so that frame numbers need not be consecutive. After decoding the present frame, the VIDEO_PLAYER outputs the frame image data to the BUFFER. The more specific operation of the VIDEO_PLAYER in decoding frames of the video file is not relevant to the present invention; thus, the present invention may be used with any VIDEO_PLAYER that decodes frames of a video file and outputs the frame image data to persistent memory. An example of such a VIDEO_PLAYER is the Active Movie Video Player provided by Microsoft Corporation in the Active Movie Software Development Kit, described in detail at http://www.microsoft.com/imdeia/activemovie/activem.htm, herein incorporated by reference in its entirety.

The FRAME_CHECK stage determines, for each object OB(j) in the second file, whether or not the following two conditions are satisfied:

i) the present frame number is a key frame for that object or the present frame number lies between two key frames for that object; and ii) the first key frame is not an end frame for that object.

If the two conditions are satisfied, then INTERPOLATE/OVERLAY/DISPLAY operations are performed.

The INTERPOLATE operation uses the coordinate data from the two key frames that sandwich the present frame and their respective frame numbers, to linearly interpolate a rectangular region for the present frame which will be its hot region. A more detailed description of the INTERPOLATE operation is described below.

OVERLAY then takes this information and modifies the data in BUFFER to identify the hot-link region. Preferably, OVERLAY modifies the data in BUFFER to identify the hot-link region by changing those pixel values corresponding to the boundaries of the hot link region to a fixed color. Alternatively, the OVERLAY function may changes the brightness and/or hue of the region, or use another technique to identify the hot-link region.

DISPLAY then Lakes the resulting data from BUFFER and displays them on a computer monitor.

If in the FRAME_CHECK stage the two conditions are not satisfied, then nothing is done further for that object in the present frame, and the frame is displayed as part of the video sequence.

A detailed description of the INTERPOLATE operation is now set forth. Assume that the VIDEO_PLAYER is displaying frame number F that lies between two key frames $N(j,k)$ and $N(j,k+1)$. As described above $N(j,k)$ is the frame number for the k-th key frame for the object $OB(j)$ and $N(j,k+1)$ is frame number for the (k+1)-th key frame for the object $OB(j)$. Also assume that the frame $N(j,k)$ is not an end frame for the object $OB(j)$. In this case, some rectangular region in frame number F is a hot-link region, and the hot link corresponding to this region will point to the address $OA(j)$. The hot region in frame F will be determined as follows:

let $x(F,1)$, $y(F,1)$, $x(F,2)$, $y(F,2)$ denote, correspondingly, the top-left x-coordinate of the rectangular hot region for $OB(j)$ in frame number F, the top-left y-coordinate for that hot region, the bottom-right x-coordinate for that hot region, and the bottom-right y-coordinate for that hot region as stored in the second file, then $$x(F,1)=(1-z)*x(j,k,1)+z*x(j,k+1,1),$$

$$y(F,1)=(1-z)*y(j,k,1)+z*y(j,k+1,1),$$

$$x(F,2)=(1-z)*x(j,k,2)+z*x(j,k+1,2),$$

$$y(F,2)=(1-z)*y(j,k,2)+z*y(j,k+1,2),$$

where $z=(F-N(j,k))/(N(j,k+1)-N(j,k))$, where * denotes multiplication and the equality in the above four equations is preferably determined after rounding to nearest integer.

INTERPOLATE performs the computation suggested by the above equations to form the coordinates of the rectangle that dictates the boundary of the hot-link region.

The table below illustrates an example of an encoding of a rectangular hot region in the HotVideo file:

| ObjectName | | http://www.object_address.html | |
|---|---|---|---|
| 0 | 65 | (20,30) | (40,70) |
| 0 | 95 | (20,30) | (40,70) |
| 0 | 120 | (70,130) | (90,170) |
| 1 | 220 | (120,130) | (140,170) |
| 0 | 300 | (120,130) | (140,170) |
| 1 | 400 | (120,130) | (140,230) |

An object called ObjectName is linked to the URL http:/www.object_addres.html. It is encoded in six key frames: 65, 95, 120, 220, 300 and 400. Frames 220 and 400 are end-frames (as indicated by the binary digit 1; those labeled 0 are key frames which are not end-frames). In the video, a hot-region rectangle is created in frame 65 with top-left vertex at (20,30) and bottom right vertex at (40,70). Thus the size of the rectangle is 20 by 40 pixels (20 in height and 40 in width).

The hot rectangular region contains within its boundaries portions of the object. For example, if the object is a person, the rectangular region may contain within it the entire person, or the person's head. The choice of rectangle delineating the object is not up to the HotVideo author; a guiding principle is that a HotVideo viewer should easily identify the object from its position relative to the associated rectangle. The hot region is then encoded in the second key frame, number 95. The rectangle is identical to the one if the first key frame.

The HotVideo Player preferably interprets this data such that for all frames between 65 and 95 (including frames 65 and 95), the rectangle with coordinates as specified will be identified as a hot-link region. The hot-link region is encoded again in the third key frame, number 120, but now at a different position. Its top-left vertex is at (70,130) and its bottom right vertex is at (90,170). The rectangle has not changed size, but it has shifted down 50 pixels and to the right 100 pixels. The HotVideo Player preferably interprets this data such that for all frames between 95 and 120, a rectangle of approximate size 20 pixels by 40 pixels and at position somewhere between its position in frame 95 and its position in frame 120 will be identified as a hot-link region. Its exact size and position will depend on the type of interpolation used. The hot region is encoded again in the fourth key frame, number 220, with a top-left vertex at coordinates (120,130) and a bottom-right vertex at coordinates (140,170). Again the rectangle has not changed size; this time it has shifted 50 pixels down, and has not shifted horizontally at all. The HotVideo Player preferably interpolates such data to create hot regions between these key frames. The hot region is encoded again in the fifth key frame, number 300, again with a top-left vertex at coordinates (120,130) and a bottom-right vertex at coordinates (140,170). Because the fourth key frame (number 220) is an end-frame, the HotVideo Player will not produce hot regions for this object for the frames 221 to 299. Finally, the hot region is encoded again in the sixth key frame, number 400, with a top-left vertex at coordinates (120,130) and a bottom-right vertex at coordinates (140,230). This time the size of the rectangle has changed. In this case, the HotVideo Player preferably interpolates such data to yield hot rectangles of increasing sizes between frames 300 and 400. The sixth key frame is also an end-frame.

HotVideo Authoring Tool

Figure 5A:
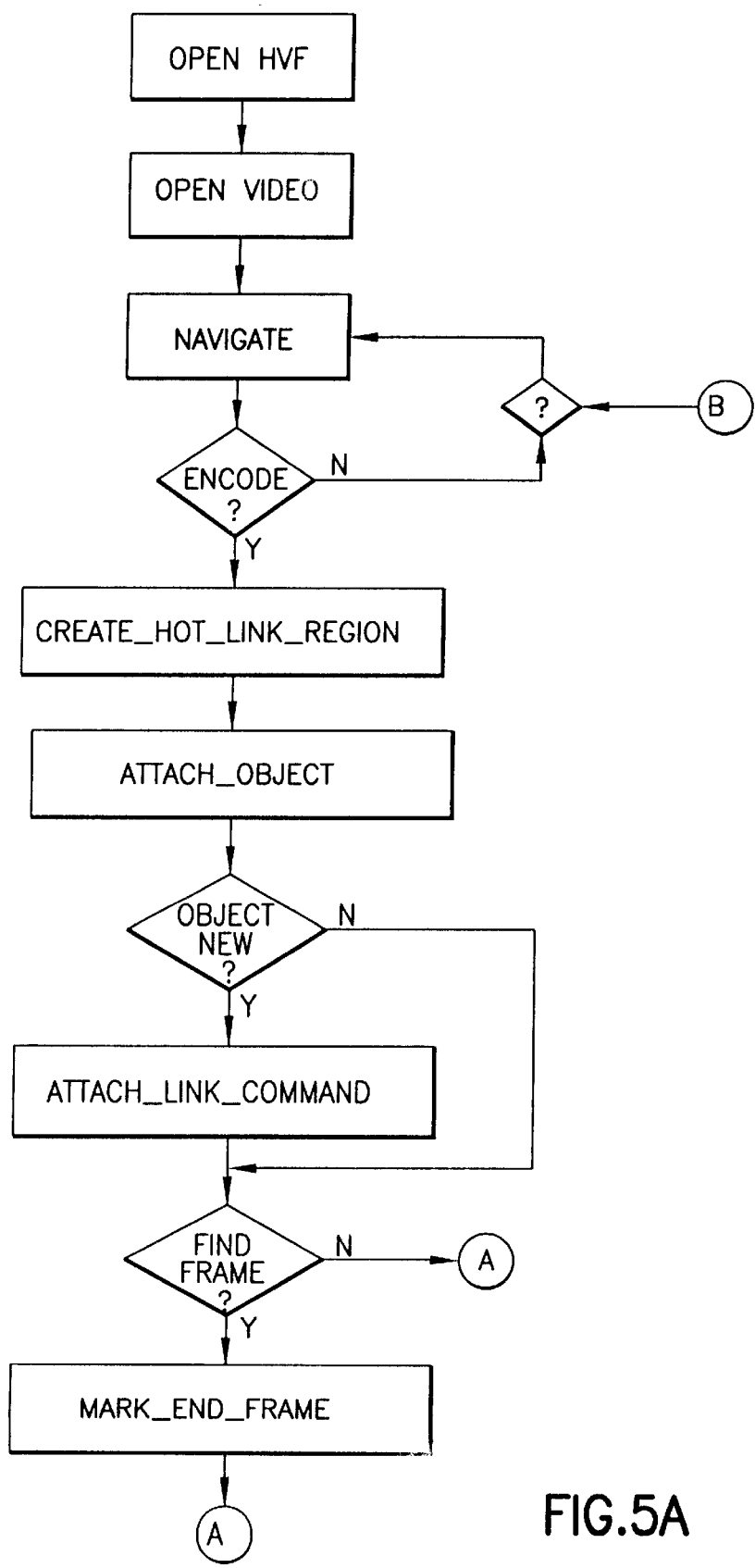
FIGS. 5(A) and (B) is a functional block diagram illustrating a tool for creating the hyperlink information stored in the hyperlink file of FIGS. 3(A)–(C).
Figure 5B:
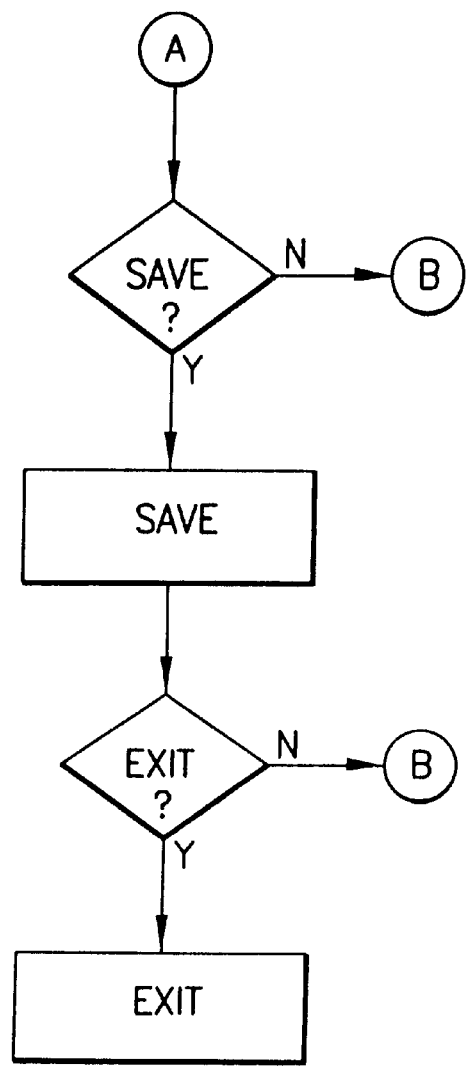

FIGS. 5(A) and (B) illustrate a functional block diagram of an embodiment of a software application that provides an author with the ability to create the HotVideo file as describe above. OPEN_HVF initiates the software application and either opens an already existing HotVideo file or labels a new HotVideo file. OPEN_VIDEO controls a HOTVIDEO PREVIEWER to open the video file associated with the HotVideo file. The HOTVIDEO PREVIEWER decodes frames of the video, integrates the information contained in the HotVideo data file with the frame image data contained in the video file, and outputs resultant frame image data for display. The functionality of the HOTVIDEO PREVIEWER is similar to the HOTVIDEO PLAYER as set forth above. However, unlike the HOTVIDEO PLAYER that uses interpolation to position the hot-link regions in frames between key frames, the HOTVIDEO PREVIEWER positions a hot-link region at its last-defined position until the next key frame or end frame is marked.

In addition, the application includes a NAVIGATE function that provides the user with the ability to navigate through the frames of the video file. For example, the NAVIGATE function preferably includes a PLAY, STOP, SEEK, STEP FORWARD, AND STEP BACKWARD function. The PLAY function controls the HOTVIDEO PREVIEWER to play the video file (i.e., step through the frames of the video file and output the frame image data for display). The STOP function controls the HOTVIDEO PREVIEWER to stop playing the video file (i.e., terminate stepping through the frames of the video file and output for display the frame image data for the frame corresponding to the stop request). The SEEK function controls the HOTVIDEO PREVIEWER to decode and output for display a particular video frame, which may be identified by the position of a slider on a slider bar as described below. This provides the author with course-grained control of the HOTVIDEO PREVIEWER. The STEP FORWARD and STEP BACKWARD function controls the HOTVIDEO PREVIEWER to decode and output for display the next subsequent frame. This provides the author with fine-grained control of the HOTVIDEO PREVIEWER.

An ENCODE function identifies when the author has decided to encode a hot-link region in the frame which is presently output for display by the video player. When the ENCODE function identifies that the author has decided to encode a hot-link region in the current frame, a DEFINE_HOT_LINK_REGION function is invoked, which is an interactive procedure which enables the author to identify a region in the current frame which is to become a hot-link region. For example, the hot-link region may be defined by the frame number and pixel coordinates of the top-left and bottom-right vertices of a rectangle as described above. In this case, the current frame number is provided by the HOTVIDEO PREVIEWER. The coordinates of the vertices of the rectangle may be created via a Windows click-and-drag process; the left button of the mouse is clicked when the cursor is on the top-left vertex; the user then drags the mouse with the left button still depressed until the cursor lies on the bottom-right vertex, at which point the user releases the depressed button.

After defining the hot-link region, preferably an ATTACH_OBJECT function is invoked that provides the author with the ability to attach the hot-link region to an object. The object may be an existing object (i.e., an object corresponding to previous hot-link regions of the video file), or a new object (i.e., an object that does not correspond to previous hot link regions of the video file). This is done by either typing in a name for the object, or in the case where the object has already been defined, by clicking on that object name listed in another window in the tool which lists all the already defined objects.

After attaching the object to a hot-link region, an ATTACH_LINK_COMMAND function is invoked that attaches a link command to the object. If the object is new, then the user identifies a link command associated with the object. If the object is not new, then the object may already have an associated link command. In this case, the ATTACH_LINK_COMMAND function may be bypassed. As described above, the link command identifies a processing system and an operation to be performed by such processing system when the link command is initiated. For example, the link command may be a URL address which is to be linked when the hot-link region is selected by a user.

The application also provides an MARK_END_FRAME function that provides the author with the ability to identify a frame encoded with HotVideo data as an end frame. Preferably, the author decides whether this key frame which had just been encoded is an end-frame or not. If it is an end-frame, the user then invokes a MARK_END_FRAME function to mark the frame as an end-frame. Preferably, the user then has the option to save the present state of the HotVideo data file and the option of exiting the application. If the user decides to continue and not exit, the user can continue to repeat the process, thereby navigating through the video file and encoding hot-link regions within frames of the video file.

In addition, the application preferably includes options that allow the author to undo a step already made, erase geometry defining a key-frame hot-link region, remove an object (which removes all information regarding the encoding of this object), plus the standard editing tools which are provided by the operating system.

Figure 6:
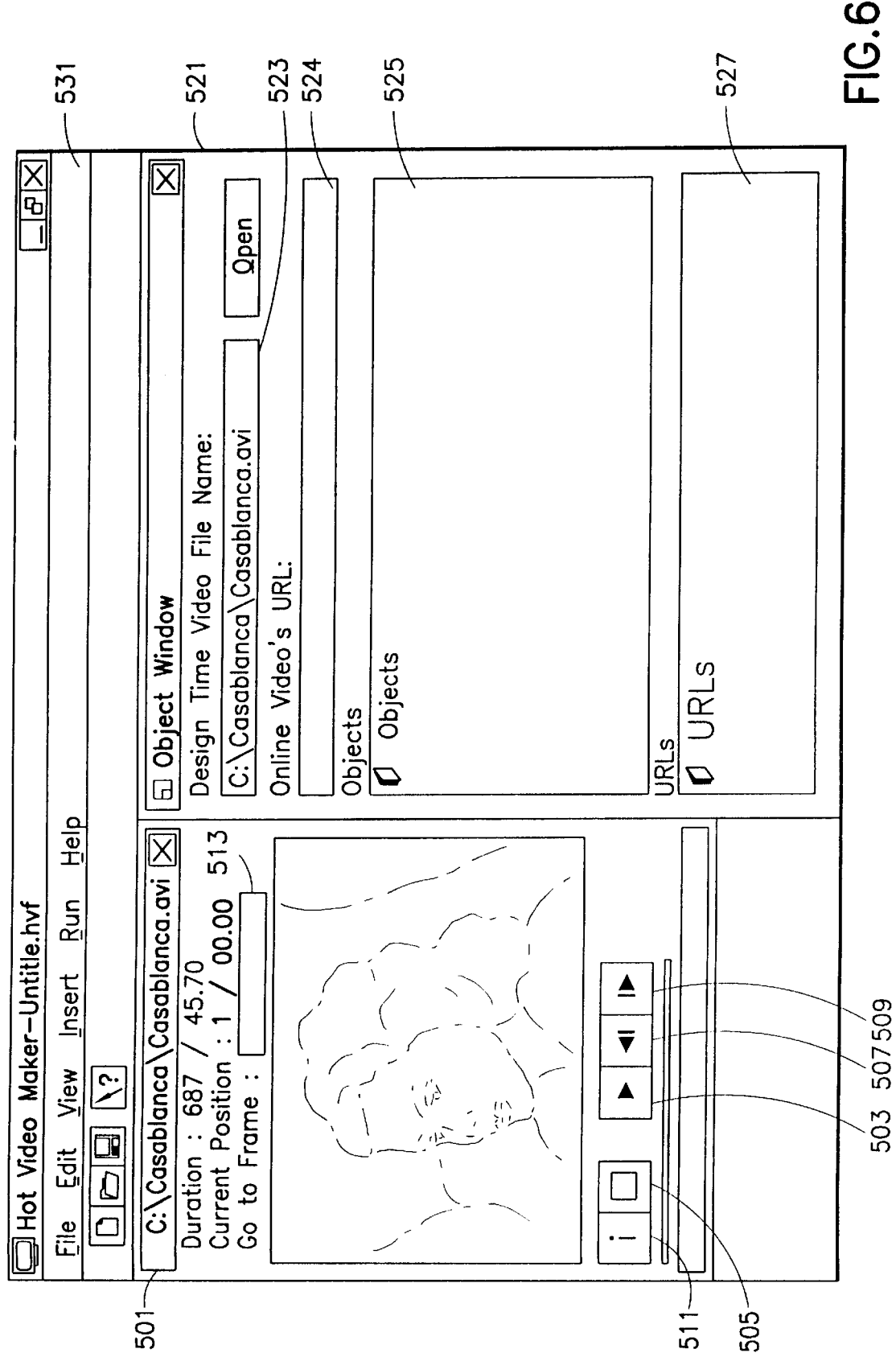
FIGS. 6 and 7 are pictorial illustrations of an example of graphical user interface for the tool of FIGS. 5(A) and (B).

FIG. 6 illustrates an example of a graphical user interface to the software application of FIGS. 5(A) and (B). In this embodiment, the link command associated with a given object is a URL; however, the present invention is not limited in this respect and can be any operation(s) performed by the processing system identified by the link command. There is the video window (VW) 501 on the left, in which the video and hot-link regions will be displayed and acted upon via standard video function buttons: play/stop button 503, step backward button 507, step forward button 509, a random seek slider 511, and an on/off hot-link highlight button 505. The play/stop button 503 provides the user with the capability to control the HOTVIDEO PREVIEWER to play the video file (i.e., step through the frames of the video file and output the frame image data for display) and stop playing the video file (i.e., terminate stepping through the frames of the video file and output for display the frame image data for the frame corresponding to the stop request). The step forward and step backward buttons 507,509 provide the user with the capability to control the HOTVIDEO PREVIEWER to decode and output for display the next frame/previous frame from the current frame. The seek slider 511 provides the user with the capability to control the HOTVIDEO PREVIEWER to decode and output for display a particular video frame, which may be identified by the position of a slider on a slider bar. Finally, the an on/off hot-link highlight button 505 provides the user with the capability of controlling the HOTVIDEO PREVIEWER to toggle on/off the display of hot-link regions in the video window 501.

On the right is the Object Window (OW) 521 with the name and location 523 of the video file which the author is encoding, the URL 524 that identifies to the HOTVIDEO PLAYER which will eventually access the HotVideo data file where to look for the associated video file, a list of objects 525 which will be defined together with their hot-link region KEY frames and coordinates, and a list of URL links 527 associated with the defined objects.

When the software application is started, preferably the tool window 531 is displayed. If the author is beginning from scratch, New is selected from the File menu. The Object Window will then appear. The Open button in the OW is then used to load the video file which will be encoded with hot-link information. The VW will then appear with the first frame of the video in the video region. If the author wishes to open an existing HotVideo data file and continue working on it, the Open button is selected from the File menu. Again the OW will appear, this time with all the already created information. Again, the Open button in the OW is used to load the video file which will be encoded with hot-link information.

To encode the first (or next) object, the author navigates through the frames of video stops at a frame where the author wishes to encode the frame with hot-link information. The author can navigate through the frames by pressing the play button 503, by using the random seek slider 511, or by entering the frame number in the appropriate box in VW 513. In addition, the author can use the step forward and step backward buttons 507,509 to identify the starting KEY frame for a hot object. Once the initial KEY frame is identifies, the author defines the hot-link region, for example by defining a rectangular region around the object. This may be accomplished utilizing conventional techniques: point the cursor at the top-left corner of the desired rectangle, drag it to the bottom-right corner, and release it. A dotted-line rectangle will appear as drawn, with corners highlighted. At the bottom of the VW, preferably the information regarding the hot-link region—its coordinates and the URL it is pointing to- is displayed. Moreover, the geometry of the hot-link region preferably can be edited, for example by clicking the left button of the mouse when the cursor is inside the rectangle and then dragging the mouse or by clicking the left button of the mouse when the cursor is on top of any of the four highlighted corners and then dragging. In addition, the author preferably can undo the definition of the hot-link region, for example, by clicking the right mouse button with the cursor inside the rectangle, a menu will appear, and then clicking cut or delete from the menu.

Once the hot-link region has been defined, the author associates the defined region to an object. For example, the author may associate the defined region with an object by clicking the right mouse button when the cursor is inside the hot-link region. A menu then pops up that includes an "Add to" button. Click on the "Add to" and a subordinate menu will prop up. This new menu will have a list of all the already defined objects plus a "New Object." If this region will be associated with an existing object, identify the existing object by clicking on the existing object with the left mouse button; otherwise enter the name of the "New Object."

If the hot-link region is associated with an existing object, the software application will automatically enter the new information in the appropriate place in the OW. For a New Object, a New Object Window will pop up and prompt you for information: the object name and the link command associated with the object, for example, a URL associated with the object. Also in this window will be a list of already used link commands; in the case that you want to specify an already used link command, simply click on it with the left button. Preferably, after a hot-link region has been associated with an object, the display attributes of the hot-link region are altered to notify the author, for example, by changing the border of the hot-link region from dotted lines to solid lines.

With the first KEY frame encoded, the author can then encode the next Key frame using the same steps described above. Preferably, as the author navigates through the frames of video, the HOTVIDEO PREVIEWER displays the last defined hot-link region. When the author wishes to encode the next KEY frame, the author can use either the last defined hot-link region, or draw define a new hot-link region. To use the last defined hot-link region, the author simply uses the last defined region as if the author had just drawn it. Should the author define a new region, preferably the last defined region still appears on the screen; this provides the author with the ability to compare the relative positions of the two regions.

Figure 7:
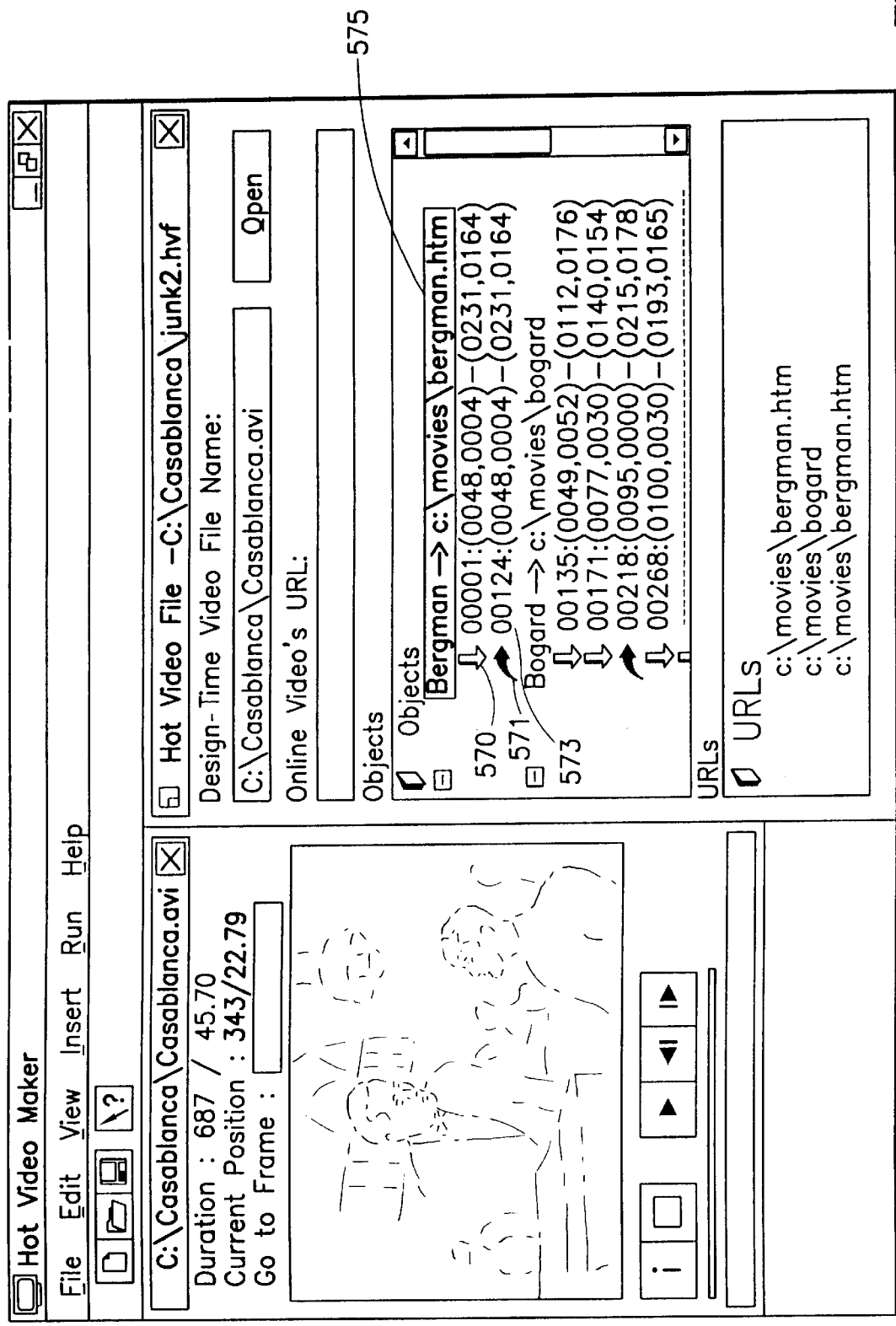

After the author has encoded the hot object in the last KEY frame of a particular time interval, the author identifies that frame as an END frame. Preferably, this is accomplished by moving the mouse into the Object Box inside the OW and clicking the left mouse button on the frame label thereby highlighting the frame. Then click on the right mouse button to pop up a menu box that includes a "Mark as End Frame" selection. Select "Mark as End Frame". As shown in FIG. 7, the KEY-frame arrow 570 will change form and become an END-frame arrow 571 thereby alerting the author that the change has taken place. Preferably, the author can change an END-frame to a KEY-frame (which means, not an END-frame) by moving the mouse into the Object box in the OW and clicking on the left mouse button over the frame label 573, and then clicking on the right mouse button to pop up a menu that includes a "Mark as Key Frame" selection. Select "Mark as Key Frame". The END-frame arrow 571 will change form and become a KEY-frame arrow 570 thereby alerting the author that the change has taken place. Preferably, any Key or End frame may be deleted by moving the mouse into the Object box in the OW and clicking on the left mouse button over the frame label 573, and then clicking on the right mouse button to pop up a menu that includes a "Delete" selection. Select "Delete".

Preferably, a single or double click on any frame label 573 in the Objects box of OW will cause the video in VW to jump to that frame. Moreover, double clicking on any object label 575 in the Objects box in OW causes the associated key frames information to collapse if they are presently visible and conversely expand if they are presently collapsed. Preferably, this may also be achieved by clicking the right button with the cursor on the object label 575 to pop up a menu that includes an appropriate command.

Preferably, the author can preview the integration of the hot-link information into the video file using the HOTVIDEO PREVIEWER, for example, by clicking on the play button and using the on-off button 505 to preview with or without the hot-link regions highlighted.

The HOTVIDEO authoring tool is advantageous because the author need not define the hot-link region in each frame wherein the hot-link region exists. The author defines hot-link regions in key frames; as described above the HOTVIDEO PLAYER utilizes interpolation to position the hot-link region in those frames which are between two key frames. This reduces the size of the HotVideo file; instead of having encoded data for each frame, one has data for key frames only. Second, the HotVideo file is much easier to encode; the encoding process is speeded up because one only has to encode key frames. For example, if on average there are 40 frames between key frames, then the size of the hot info data file is approximately ¹⁄₄₀th than what it would have been had every frame been encoded, and also the encoding process would be approximately 40 times faster.

In addition, the present invention preferably stores the HotVideo data and corresponding video file in separate and distinct files. This provides enormous flexibility to users. For example, one may transmit HotVideo data to a user who already has a local copy of a video (e.g., one has a copy of video on a CD and obtains the HotVideo data from a Web site). However, the present invention is not limited in this respect; in the alternative, the HotVideo data of the present invention and associated video data may be stored in a common file.

It should be apparent to those skilled in the art that the methods and functionality of the present invention as described above can be embodied in a program storage device readable by a machine, that tangibly embodies the methods and functionality of the present invention as described above and is used by the machine in the execution of a program of instructions. While the invention as been described in terms of preferred embodiments, those skilled in the art will recognize that the invention can be practiced with modification within the spirit and scope of the appended claims.

What is claimed is:

1. A method for representing hyperlinks in frames of video stored in a first file, the method comprising:

storing in a second file, different from said first file, information defining at least one hot region in said frames of video stored in said first file, wherein said second file allows said information to be at least one of accessed, manipulated, stored, and transmitted separate from and without having access to said first file, said second file comprising a header information followed by a sequential listing of hot objects in the hot regions in said frames of video in said first file, wherein each hot object listing further comprises a sequential listing of identifiers enclosed by an identification element and a trailer element, and each identifier further comprises:

a bit B(j,k) specifying whether a k-th key frame of a j-th object comprises an end frame;

a number N(j,k) identifying a frame number of the k-th key frame of the j-th object; and a listing of coordinates of said hot regions.

2. The method of claim 1, wherein said video is encoded in a standard format.

3. The method of claim 2, wherein said standard format comprises one of AVI, MPEG, raw YUV, and raw RGB.

4. The method of claim 1, wherein said information defines a boundary of said at least one hot region in a plurality of frames of said video.

5. The method of claim 4, wherein said at least one hot region comprises a polygon comprising a plurality of vertices, and wherein said boundary of said at least one hot region is defined by positions of vertices of said polygon.

6. The method of claim 5, wherein said polygon comprises a rectangle having a top left vertex, a top right vertex, a bottom left vertex and a bottom right vertex, and wherein said boundary of said rectangle is defined by positions of said top left vertex and said bottom right vertex.

7. The method of claim 4, wherein said at least one hot region comprises a circle having a center and a radius, and said boundary of said hot region is defined by a position of said center and said radius.

8. The method of claim 1, wherein said information defines said at least one hot region in key frames of said video stored in said first file, wherein one key frame comprises a start frame and one key frame comprises an end frame, and wherein said hot region is not defined in at least one frame between said start frame and said end frame.

9. The method of claim 8, wherein said key frames include at least one intermediate key frame between said start frame and said end frame, wherein said hot region is not defined in at least one frame between said start frame and said at least one intermediate key frame, and wherein said hot region is not defined in frames between said at least one intermediate key frame said end frame.

10. The method of claim 9, wherein said key frames include first and second intermediate key frames between said start frame and said end frame, and wherein said hot region is not defined in at least one frame between said first intermediate key frame and said second intermediate key frame.

11. The method of claim 8, further comprising:

identifying said key frames based upon user input; and generating said information defining at least one hot region based upon user input.

12. The method of claim 1, further comprising:

associating said hot region with at least one link command based upon user input; and representing the association between said hot region and said at least one link command in said second file.

13. The method of claim 12, wherein the association between said hot region and said at least one link command is represented by an organization of data stored in said second file.

14. The method of claim 13, wherein said data stored in said second file includes an entry identifying said hot region and a corresponding link command.

15. The method of claim 1, further comprising:

assigning an object identifier to an object corresponding to said hot region;

associating said hot region with said object identifier based upon user input; and representing the association between said hot region and said object identifier in said second file.

16. The method of claim 15, wherein the association between said hot region and said object identifier is represented by an organization of data stored in said second file.

17. The method of claim 16, wherein said data stored in said second file includes an entry identifying said hot region and a corresponding object identifier.

18. The method of claim 15, further comprising:

associating at least one link command with said object identifier based upon user input, thereby associating said at least one link command with said hot region; and representing the association between said link command and said object identifier in said second file.

19. The method of claim 18, wherein the association between said link command and said object identifier is represented by organization of data stored in said second file.

20. The method of claim 19, wherein said data stored in said second file includes an entry identifying said object identifier, a corresponding link command, and corresponding hot region.

21. A method for representing hyperlinks in frames of video, the method comprising:

storing information defining at least one hot region in key frames of said video as a listing in a file of said key frames associated with each said at least one hot region, wherein one key frame comprises a start frame and one key frame comprises an end frame, and wherein said hot region is not defined in at least one frame between said start frame and said end frame, wherein said listing in a file of said information is selectively at least one of accessed, manipulated, stored, and transmitted separate from and without having access to a file containing said frames of video and said listing of information in said file comprises a header information followed by a sequential listing of hot objects in the hot regions in said frames of video, wherein each hot object listing further comprises a sequential listing of identifiers enclosed by an identification element and a trailer element and each identifier further comprises:

a bit B(j,k) specifying whether a k-th key frame of a j-th object comprises an end frame;

a number N(j,k) identifying a frame number of the k-th key frame of the j-th object; and a listing of coordinates of said hot regions.

22. The method of claim 21, wherein said key frames include at least one intermediate key frame between said start frame and said end frame, wherein said hot region is not defined in at least one frame between said start frame and said at least one intermediate key frame, and wherein said hot region is not defined in frames between said at least one intermediate key frame said end frame.

23. The method of claim 22, wherein said key frames include first and second intermediate key frames between said start frame and said end frame, and wherein said hot region is not defined in at least one frame between said first intermediate key frame and said second intermediate key frame.

24. The method of claim 21, further comprising:
identifying said key frames based upon user input; and
generating said information defining at least one hot region based upon user input.

25. The method of claim 21, wherein said video is encoded in a standard format.

26. The method of claim 25, wherein said standard format comprises one of AVI, MPEG, raw YUV, and raw RGB.

27. The method of claim 21, wherein said information defines a boundary of said at least one hot region in a plurality of key frames of said video.

28. The method of claim 27, wherein said at least one hot region comprises a polygon comprising a plurality of vertices, and wherein said boundary of said at least one hot region is defined by positions of vertices of said polygon.

29. The method of claim 28, wherein said polygon comprises a rectangle having a top left vertex, a top right vertex, a bottom left vertex and a bottom right vertex, and wherein said boundary of said rectangle is defined by a position of said top left vertex and a position of said bottom right vertex.

30. The method of claim 27, wherein said at least one hot region comprises a circle having a center and a radius, and said boundary of said hot region is defined by a position of said center and said radius.

31. The method of claim 21, further comprising:
associating said hot region with at least one link command based upon user input; and representing an association between said hot region and said at least one link command in said information.

32. The method of claim 31, wherein the association between said hot region and said at least one link command is represented by an organization of said information.

33. The method of claim 32, wherein said information comprises an entry identifying said hot region and a corresponding link command.

34. The method of claim 21, further comprising:
assigning an object identifier to an object corresponding to said hot region;
associating said hot region with said object identifier based upon user input;
representing an association between said hot region and said object identifier in said information.

35. The method of claim 34, wherein the association between said hot region and said object identifier is represented by an organization of said information.

36. The method of claim 35, wherein said information comprises an entry identifying said hot region and corresponding object identifier.

37. The method of claim 34, further comprising:
associating at least one link command with said object identifier based upon user input, thereby associating said at least one link command with said hot region; and representing the association between said at least one link command and said object identifier in said information.

38. The method of claim 37, wherein an association between said link command and said object identifier is represented by an organization of said information.

39. The method of claim 38, wherein said information comprises an entry identifying said object identifier, a corresponding link command, and a corresponding hot region.

40. The method of claim 21, wherein said video is stored in a first file and said information is stored in a second file, different from said first file.

41. The method of claim 21, wherein said video and information are stored in a common file.

42. A method for integrating hyperlinks with frames of video comprising:
providing a first file storing frames of video;
providing a second file, different from said first file, storing information defining at least one hot region in said frames of video, said second file allowing said information to be at least one of accessed, manipulated, stored, and transmitted separate from and without having access to said first file, said second file comprising a header information followed by a sequential listing of hot objects in the hot regions in said frames of video in said first file, wherein each hot object listing further comprises a sequential listing of identifiers enclosed by an identification element and a trailer element, each identifier further comprising:
a bit B(j,k) specifying whether a k-th key frame of a j-th object comprises an end frame;
a number N(j,k) identifying a frame number of the k-th key frame of the j-th object; and
a listing of coordinates of said hot regions;
selecting at least one frame of video for display;
upon determining that said second file includes information that defines a hot region in the selected frame, identifying a plurality of pixels of the selected frame that correspond to said hot region; and
modifying a color value of the identified pixels to thereby identify said hot region in said frame.

43. The method of claim 42, wherein said video is encoded in a standard format.

44. The method of claim 43, wherein said standard format comprises one of AVI, MPEG, raw YUV, and raw RGB.

45. The method of claim 42, wherein said information defines a boundary of said at least one hot link region in a plurality of frames of video; and
wherein said identifying a plurality of pixels of the selected frame that correspond to said hot region includes determining pixels of the selected frame that lie in the vicinity of said boundary of said at least one hot region in the selected frame.

46. The method of claim 45,
wherein said at least one hot region comprises a polygon comprising a plurality of vertices, and wherein said boundary of said at least one hot region is defined by positions of vertices of said polygon; and
wherein said identifying a plurality of pixels of the selected frame that correspond to said hot region includes determining pixels of the selected frame that lie in the vicinity of lines that connect said vertices.

47. The method of claim 46,
wherein said polygon comprises a rectangle having a top left vertex, a top right vertex, a bottom left vertex and a bottom right vertex, and wherein said boundary of said rectangle is defined by positions of said top left vertex and said bottom right vertex; and wherein said identifying a plurality of pixels of the selected frame that correspond to said hot region includes determining pixels of the selected frame that lie in the vicinity of said boundary of said rectangle.

48. The method of claim 45,
wherein said at least one hot region comprises a circle having a center and a radius, and said boundary of said hot region is defined by a position of said center and said radius; and
wherein said identifying a plurality of pixels of the selected frame that correspond to said hot region includes determining pixels of the selected frame that lie in the vicinity of said boundary of said circle.

49. The method of claim 42, wherein said information defines said at least one hot region in key frames of said video stored in said first file, wherein one key frame comprises a start frame and one key frame comprises an end frame, and wherein said hot region is not defined in at least one frame between said start frame and said end frame.

50. The method of claim 49, wherein said key frames include at least one intermediate key frame between said start frame and said end frame, wherein said hot region is not defined in at least one frame between said start frame and said at least one intermediate key frame, and wherein said hot region is not defined in frames between said at least one intermediate key frame said end frame.

51. The method of claim 50, wherein said key frames include first and second intermediate key frames between said start frame and said end frame, and wherein said hot region is not defined in at least one frame between said first intermediate key frame and said second intermediate key frame.

52. The method of claim 49,
wherein said determining whether said second file includes information that defines a hot region in the selected frame includes determining whether the selected frame lies between key frames; and
wherein said identifying a plurality of pixels of the selected frame that correspond to said hot region includes:
interpolating a position of said hot region in said selected frame based upon a position of said hot region in said key frames, and
identifying pixels corresponding to said hot region in said selected frame based upon the interpolated position of said hot region in said selected frame.

53. The method of claim 42, further comprising:
storing a link command associated with said at least one hot region; and
executing said link command upon user selection of said at least one hot region.

54. A method for integrating hyperlinks with frames of video comprising:
providing frames of video;
providing information defining at least one hot region in key frames of said video as a listing of said key frames, said listing comprising a listing of said key frames associated with each said at least one hot region, wherein one key frame comprises a start frame and one key frame comprises an end frame, wherein said hot region is not defined in at least one frame between said start frame and said end frame, and wherein said listing in a file of said information is selectively at least one of accessed, manipulated, stored, and transmitted separate from and without having access to a file containing said frames of video, said file comprising a header information followed by a sequential listing of hot objects in the hot regions in said frames of video, wherein each hot object listing further comprises a sequential listing of identifiers enclosed by an identification element and a trailer element, each identifier further comprising:
a bit B(j,k) specifying whether a k-th key frame of a j-th object comprises an end frame;
a number N(j,k) identifying a frame number of the k-th key frame of the j-th object; and
a listing of coordinates of said hot regions;
selecting at least one frame of video for display;
upon determining that said information defines a hot region in the selected frame, identifying a plurality of pixels of the selected frame that correspond to said hot region; and
modifying a color value of the identified pixels to thereby identify said hot region in said frame.

55. The method of claim 54, wherein said key frames include at least one intermediate key frame between said start frame and said end frame, wherein said hot region is not defined in at least one frame between said start frame and said at least one intermediate key frame, and wherein said hot region is not defined in frames between said at least one intermediate key frame said end frame.

56. The method of claim 55, wherein said key frames include first and second intermediate key frames between said start frame and said end frame, and wherein said hot region is not defined in at least one frame between said first intermediate key frame and said second intermediate key frame.

57. The method of claim 54,
wherein said determining whether said second file includes information that defines a hot region in the selected frame includes determining whether the selected frame lies between key frames; and
wherein said identifying a plurality of pixels of the selected frame that correspond to said hot region includes:
interpolating position of said hot region in said selected frame based upon position of said hot region in said key frames, and
identifying pixels corresponding to said hot region in said selected frame based upon the interpolated position of said hot region in said selected frame.

58. The method of claim 54, wherein said video is encoded in a standard format.

59. The method of claim 58, wherein said standard format comprises one of AVI, MPEG, raw YUV, and raw RGB.

60. The method of claim 54,
wherein said information defines a boundary of said at least one hot link region in a plurality of key frames of video; and
wherein said identifying a plurality of pixels of the selected frame that correspond to said hot region includes determining pixels of the selected frame that lie in the vicinity of said boundary of said at least one hot region in the selected frame.

61. The method of claim 60,
wherein said at least one hot region comprises a polygon comprising a plurality of vertices, and wherein said boundary of said at least one hot region is defined by positions of vertices of said polygon; and
wherein said identifying a plurality of pixels of the selected frame that correspond to said hot region includes determining pixels of the selected frame that lie in the vicinity of lines that connect said vertices.

62. The method of claim 61, wherein said polygon comprises a rectangle having a top left vertex, a top right vertex, a bottom left vertex and a bottom right vertex, and wherein said boundary of said rectangle is defined by positions of said top left vertex and said bottom right vertex; and wherein said identifying a plurality of pixels of the selected frame that correspond to said hot region includes determining pixels of the selected frame that lie in the vicinity of said boundary of said rectangle.

63. The method of claim 60, wherein said at least one hot region comprises a circle having a center and a radius, and said boundary of said hot region is defined by a position of said center and said radius; and wherein said identifying a plurality of pixels of the selected frame that correspond to said hot region includes determining pixels of the selected frame that lie in the vicinity of said boundary of said circle.

64. The method of claim 54, further comprising:

storing a link command associated with said at least one hot region; and executing said link command upon user selection of said at least one hot region.

65. The method of claim 54, wherein said video is stored in a first file and said information is stored in a second file different from said first file.

66. The method of claim 54, wherein said video and information are stored in a common file.

67. An apparatus for integrating hyperlinks in video, comprising:

a video file reader;

a display; and a graphical user interface, said graphical user providing an interface to:
  select and open a video file, using said video file reader;
  display frames of said video file, using said display for viewing;
  designate a frame of said video file as being a key frame;
  designate at least one region of said key frame as being a hot-link region; and
  store said key frame and said hot-link region as a listing in a file, wherein said listing in a file is selectively at least one of accessed, manipulated, stored, and transmitted separate from and without having access to said video file containing said frames of video, said file comprising a header information followed by a sequential listing of hot objects in the hot regions in said frames of video in said first file, wherein each hot object listing further comprises a sequential listing of identifiers enclosed by an identification element and a trailer element and each identifier further comprises:
    a bit $B(j,k)$ specifying whether a k-th key frame of a j-th object comprises an end frame;
    a number $N(j,k)$ identifying a frame number of the k-th key frame of the j-th object; and
    a listing of coordinates of said hot regions.

68. An apparatus for displaying video with integrated hyperlinks, comprising:

a reader to read a hot-link file containing a listing of hot-link regions and key frames;

a video player to play frames of a video file; and a frame checker to determine whether said frame comprises any of said key frames in said hot-link file, wherein said listing in said hot-link file is selectively at least one of accessed, manipulated, stored, and transmitted separate from and without having access to said video file, said hot-link file comprising a header information followed by a sequential listing of hot objects in the hot regions in said frames of video in said video file, wherein each hot object listing further comprises a sequential listing of identifiers enclosed by an identification element and a trailer element and each identifier further comprises:
  a bit $B(j,k)$ specifying whether a k-th key frame of a j-th object comprises an end frame;
  a number $N(j,k)$ identifying a frame number of the k-th key frame of the j-th object;
  a listing of coordinates of said hot regions.

69. A signal-bearing medium tangibly embodying a program of machine-readable instructions executable by a digital processing apparatus to perform a method of representing hyperlinks in frames of video stored in a first file, the method comprising:

storing in a second file, different from said first file, information defining at least one hot region in said frames of video stored in said first file, wherein said second file allows said information to be at least one of accessed, manipulated, stored, and transmitted separate from and without having access to said first file, said second file comprising a header information followed by a sequential listing of hot objects in the hot regions in said frames of video in said first file, wherein each hot object listing further comprises a sequential listing of identifiers enclosed by an identification element and a trailer element and each identifier further comprises:
  a bit $B(j,k)$ specifying whether a k-th key frame of a j-th object comprises an end frame;
  a number $N(j,k)$ identifying a frame number of the k-th key frame of the j-th object; and
  a listing of coordinates of said hot regions.

* * * * *